(12) United States Patent
Uchiyama et al.

(10) Patent No.: US 6,643,460 B2
(45) Date of Patent: Nov. 4, 2003

(54) CAMERA AND FOCAL POINT DETECTION APPARATUS

(75) Inventors: Shigeyuki Uchiyama, Komae (JP); Chiyuki Kuwata, Zushi (JP); Masamitsu Ozawa, Kawasaki (JP); Hideki Kanbayashi, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/769,372

(22) Filed: Jan. 26, 2001

(65) Prior Publication Data

US 2002/0025155 A1 Feb. 28, 2002

(30) Foreign Application Priority Data

Jan. 27, 2000 (JP) ........................ 2000-018546
May 25, 2000 (JP) ........................ 2000-154187

(51) Int. Cl.[7] ............................................. G03B 13/00
(52) U.S. Cl. ...................................... 396/114; 396/111
(58) Field of Search ................................ 396/111, 113, 396/114, 119, 358; 359/618, 629

(56) References Cited

U.S. PATENT DOCUMENTS 5,257,062 A * 10/1993 Moriyama ................. 396/114
5,771,413 A * 6/1998 Suda et al. ................. 396/114
6,297,909 B1 * 10/2001 Sensui ........................ 359/618

FOREIGN PATENT DOCUMENTS

JP          9-184966          7/1997

* cited by examiner

Primary Examiner—Russell Adams
Assistant Examiner—Arthur A Smith

(57) ABSTRACT

A focal point detection apparatus that includes a sub-mirror constituted of a concave mirror and performs focal point detection in the phase difference detection method is capable of implementing a focal point detection over a wide range. A light flux for focal point detection having passed through a semi-transmissive reflecting member and a reflecting member constituted of the concave mirror described above enters a focal point detection optical system. A correction optical system provided between the semi-transmissive reflecting member and the reflecting member constituted of the concave mirror corrects an offset of the direction along which the light flux for focal point detection advances caused by the reflecting member constituted of the concave mirror, in conformance to the image height at the focal point detection position. By utilizing this correction optical system, it becomes possible to reduce the size of the focal point detection apparatus while assuring a large focal point detection area.

12 Claims, 10 Drawing Sheets

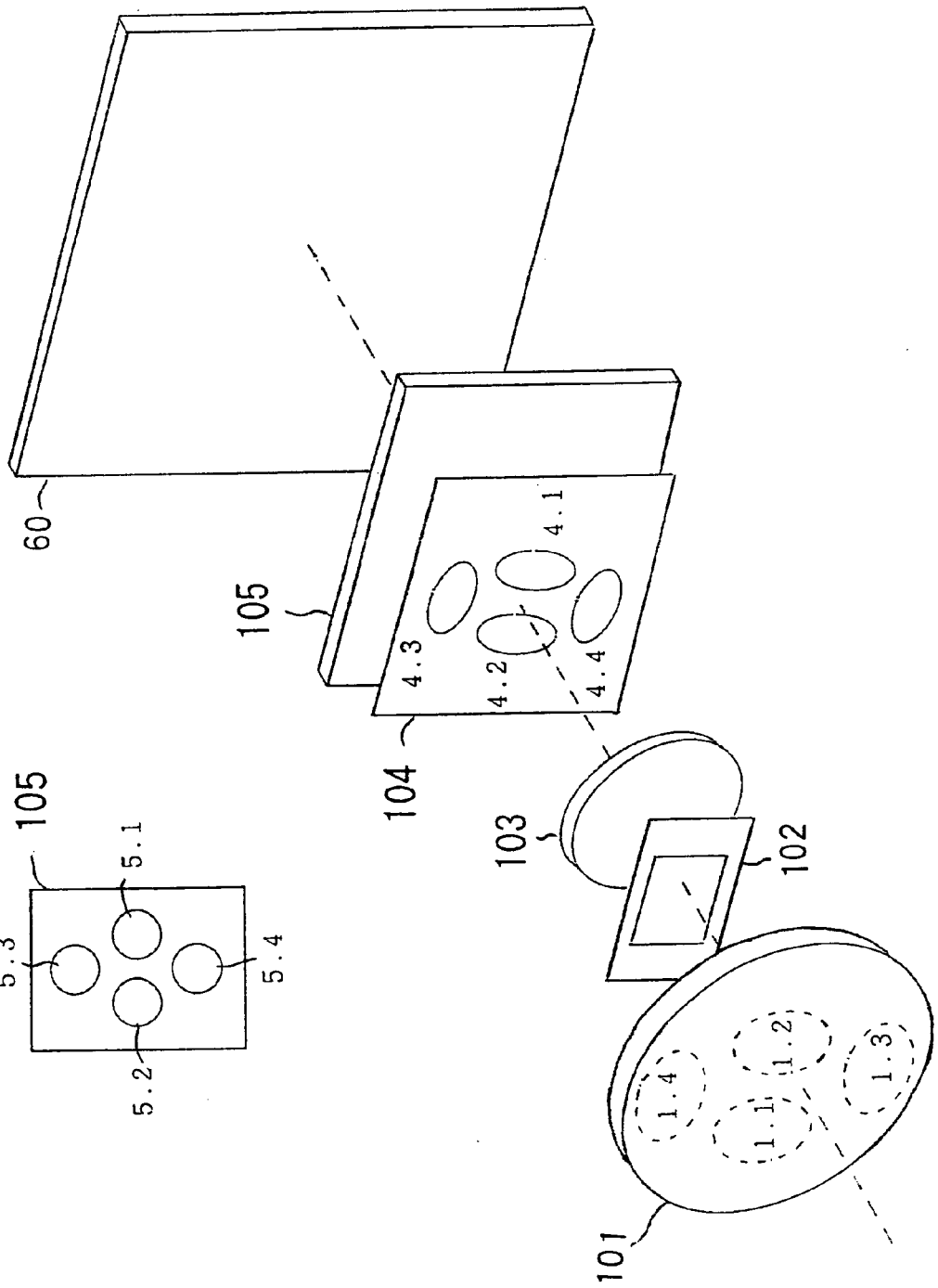
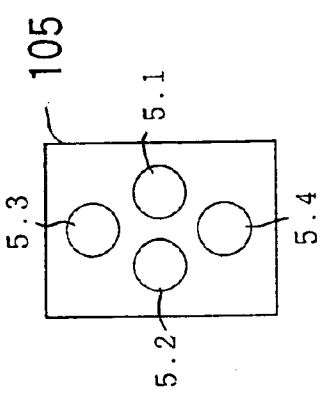
FIG. 9A
FIG. 9B

CAMERA AND FOCAL POINT DETECTION APPARATUS

INCORPORATION BY REFERENCE

The disclosures of the following priority applications are herein incorporated by reference:

Japanese Patent Application No. 2000-018546 filed Jan. 27, 2000

Japanese Patent Application No. 2000-154187 filed May 25, 2000

BACKGROUND OF THE INVENTION

1. Field of the Invention

The present invention relates to a focal point detection apparatus having a focal point detection area over a wide range within the photographic field and a camera that employs the focal point detection apparatus.

2. Description of the Related Art

Focal point detection apparatuses employed in single lens reflex cameras in the known art often adopt the following focal point detection method. This type of focal point detection apparatus guides two subject images manifesting a parallax to a couple of rows of. photoelectric conversion elements and judges the focal adjustment state by calculating the degree of the relative offset manifesting between the two images in correspondence to the image outputs from the individual photoelectric conversion element rows.

Japanese Laid-Open Patent Publication No. H9-184966 discloses a focal point detection apparatus that enables a focal point detection over a wide range within the photographic field by adopting the phase difference detection method described above. In this focal point detection apparatus, a two-dimensional image sensor is utilized in place of the pair of photoelectric conversion element rows, in order to assure a wide range of focal point detection area around the optical axis. In addition, in order to expand the focal point detection area in the photographic field along the vertical direction, i.e., the direction along which the short side of the image plane extends, a concave mirror is employed to constitute a sub-mirror that guides the light flux for focal point detection having been transmitted through the main mirror to the focal point detection apparatus.

By utilizing the concave mirror, the focal point detection apparatus in the prior art described above can be manufactured as a compact unit, since it is not necessary to increase the size of the apparatus even when a focal point detection area for a high image height in vertical direction is provided along the vertical direction. However, if the image height along the horizontal direction is increased, the width of the two-dimensional image sensors also must be increased. In addition, the sensor itself constituted of a single two-dimensional image sensor is bound to become large.

SUMMARY OF THE INVENTION

A first object of the present invention is to achieve miniaturization for a focal point detection apparatus and ultimately for a camera in which a light flux having been reflected at a concave sub-mirror is guided to the focal point detection apparatus, while enabling a focal point detection over a wide range along the vertical direction.

A second object of the present invention is to miniaturize a focal point detection apparatus while achieving a focal point detection over a wide range in the photographic field along the horizontal direction.

The camera according to the present invention comprises a semi-transmissive reflecting member that reflects a light flux from a photographic optical system to an observation optical system and also allows some of the light flux to be transmitted as a light flux for focal point detection, a reflecting member constituted of a concave mirror that reflects the light flux for focal point detection having been transmitted through the semi-transmissive reflecting member and a focal point detection apparatus that detects a focal adjustment state of a subject image formed by the photographic optical system by using the reflected light flux for focal point detection. It is further provided with a correction optical system that changes the direction along which the light flux for focal point detection advances, within the optical path between the semi-transmissive reflecting member and the reflecting member. By adopting the structure described above, the first object is achieved.

The focal point detection apparatus, which is provided with a focal point detection optical system having an aperture, detects the focal adjustment state of the subject image at a predetermined image height position in the photographic field at the photographic optical system. The correction optical system changes the direction along which the light flux for focal point detection advances by deflecting, in correspondence to the image height position, the direction along which the aperture is projected backward toward the photographic optical system by the reflecting member.

The correction optical system may be formed as an integrated part of the semi transmissive reflecting member. In addition, the correction optical system and the semi-transmissive reflecting member may be formed as in the form of a plano-convex lens.

The focal point detection apparatus according to the present invention comprises an image sensor chip having a pair of two-dimensional image sensors corresponding to a focal point detection area along a substantially horizontal direction of a photographic field and a pair of two-dimensional image sensors corresponding to a focal point detection area along a substantially vertical direction of the photographic field and a focal point detection optical system that forms separate images of a light flux from a subject having passed through a photographic lens onto the pair of two-dimensional image sensors provided along the substantially horizontal direction and onto the pair of two-dimensional image sensors provided along the substantially vertical direction. In the image sensor chip, the pair of two-dimensional image sensors provided along the substantially horizontal direction over small intervals from each other along the horizontal direction are set between the pair of two-dimensional image sensors provided along the substantially vertical direction so that the pair of two-dimensional image sensors provided along the substantially horizontal direction and the pair of two-dimensional image sensors provided along the substantially vertical direction form a cross. By adopting the structure described above, the second object is achieved.

The camera according to the present invention having the semi-transmissive reflecting member, the reflecting member constituted of a concave mirror and the correction optical system that achieves the first object may employ a focal point detection apparatus that detects the focal adjustment state of a subject image formed by the photographic optical system by guiding a reflected light flux for focal point detection to the image sensor. The correction optical system may be omitted in this camera. In addition, the correction optical system may be omitted and the concave mirror may be replaced by a plane mirror in the camera.

BRIEF DESCRIPTION OF THE DRAWINGS

FIG. 9 is a perspective of the focal point optical system employed in the second embodiment;

DESCRIPTION OF THE PREFERRED EMBODIMENTS

First Embodiment

Figure 1:
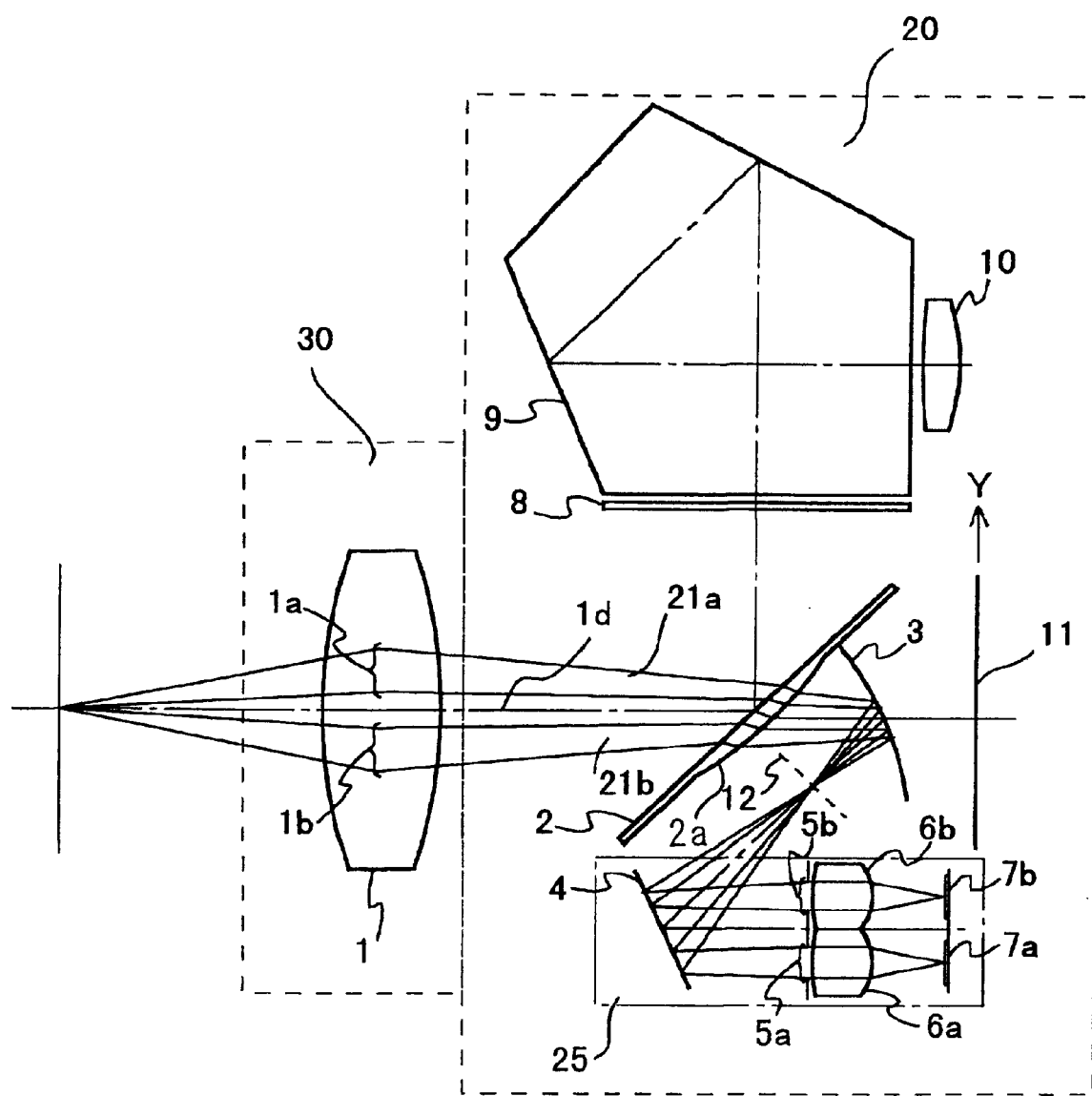
FIG. 1 is a block diagram of the camera achieved in a first embodiment.

FIG. 1 shows the camera according to the present invention in the first embodiment. Reference numeral 1 indicates a photographic optical system, reference numeral 2 indicates a main mirror, reference numeral 3 indicates a sub-mirror, reference numeral 4 indicates a reflecting mirror, reference numerals 5a and 5b indicate apertures, reference numerals 6a and 6b indicate image re-forming lenses, reference numerals 7a and 7b indicate light-receiving elements, reference numeral 8 indicates a focusing screen, reference numeral 9 indicates a pentaprism, reference numeral 10 indicates an eyepiece lens, reference numeral 11 indicates a film plane and reference numeral 12 indicates a film equivalent plane. Reference numeral 20 indicates the camera and reference numeral 30 is an interchangeable lens. FIG. 1 shows a state in which the interchangeable lens 30 is mounted at the camera 20.

A light flux from a subject travels through the photographic optical system 1 and part of the light flux is reflected upward at the main mirror 2 constituted of a half mirror to form an image at the focusing screen 8. The subject image formed at the focusing screen 8 passes through the pentaprism 9 and is observed through the eyepiece lens 10. The focusing screen 8, the pentaprism 9 and the eyepiece lens 10 constitute an observation optical system.

Focal point detection light fluxes 21a and 21b having been transmitted through the main mirror 2 are reflected downward by the sub-mirror 3. The focal point detection light fluxes 21a and 21b having been reflected at the sub-mirror 3 are reflected again at the reflecting mirror 4 and pass through the apertures 5a and 5b and their images are re-formed at the light-receiving elements 7a and 7b by the image re-forming lenses 6a and 6b. The reflecting mirror 4, the apertures 5a and 5b, the image re-forming lenses 6a and 6b constitute a focal point detection optical system. The focal point detection optical system and the light-receiving elements 7a and 7b constitute a focal point detection apparatus 25.

A concave mirror having an aspheric surface such as a spheroidal surface is used to constitute the sub-mirror 3 to correct distortion of the image formed on the light-receiving elements 7a and 7b. The shape of the aspheric surface is asymmetric along the short side of the photographic field (along the direction of the Y axis) relative to the center of the sub-mirror (relative to the point at which the sub-mirror intersects the optical axis 1d).

The surface of the main mirror 2 toward the photographic optical system 1 is constituted of a plane half mirror and a convex lens 2a capable of condensing light is formed at the rear surface of the main mirror 2. The convex lens 2a changes the direction of which the images of the apertures are projected backwards. The following explanation is given on the assumption that the convex lens 2a constitutes a correction optical system 16. The correction optical system 16 is provided between the semi-transmissive reflecting member, i.e., the surface of the main mirror 2, and the concave mirror, i.e., the sub-mirror 3.

The main mirror 2 is a plano-convex lens formed by using, for instance, a transparent plastic material. A semi-transparent mirror is formed at the flat surface of the main mirror 2 through multilayer film coating. By constituting the semi-transmissive member and the correction optical system as an integrated unit as described above, the number of required components can be reduced and, at the same time, a sufficient degree of strength can be assured as well.

Figure 2:
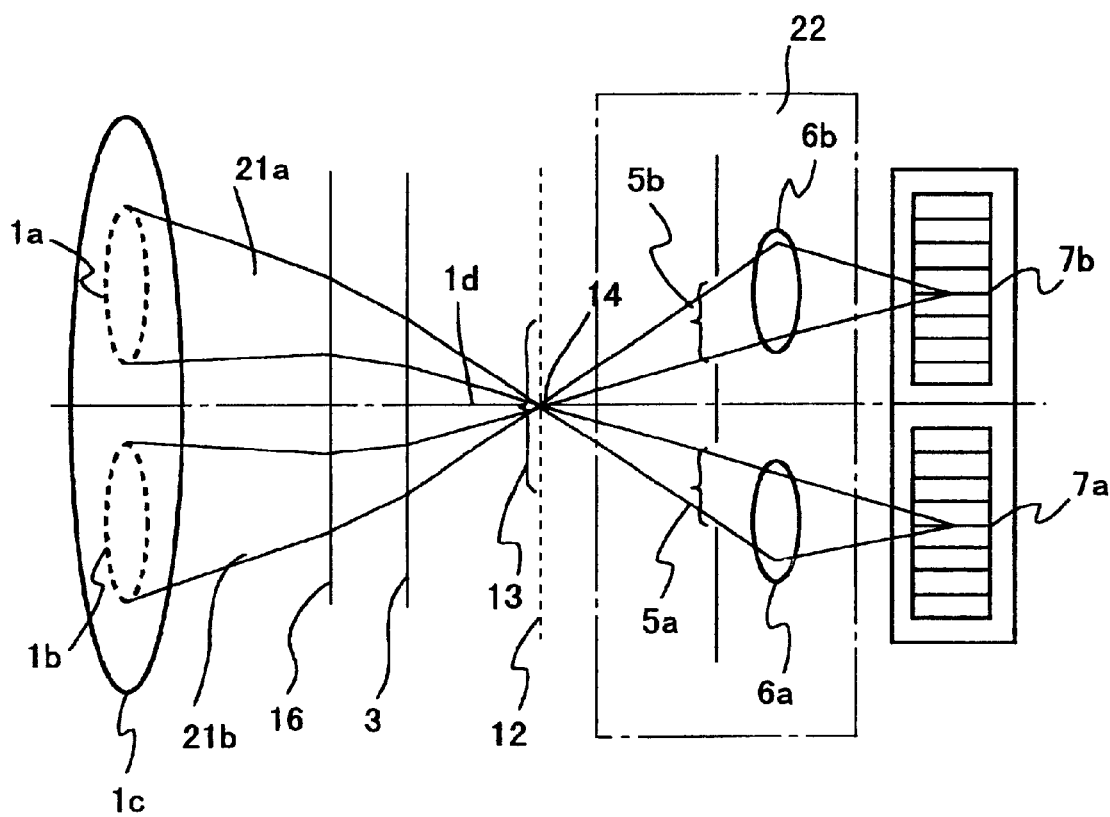
FIG. 2 is an expanded view of the focal point detection optical system employed in the first embodiment.

FIG. 2 is an expanded view provided to illustrate the functions of the correction optical system 16, the concave mirror 3 and a focal point detection optical system 22. The illustrations of the correction optical system 16, i.e. the convex lens 2a at the rear surface of the main mirror 2, and the sub-mirror 3 are simplified, and the illustration of the reflecting mirror 4 is omitted altogether. In FIG. 2, the apertures 5a and 5b and the image re-forming lenses 6a and 6b constitute the focal point detection optical system 22.

The light flux for focal point detection 21a having passed through an aperture reverse-projected image 1a at an exit pupil 1c passes through the correction optical system 16 and the sub-mirror 3, and after achieving focus on the film equivalent plane 12, it sequentially passes through the aperture 5a and the image-reforming lens 6a before forming an image on the light-receiving element 7a. Likewise, the light flux for focal point detection 21b having passed through an aperture reverse-projected image 1b at the exit pupil 1c passes through the correction optical system 16 and the sub-mirror 3, and after achieving focus on the film equivalent plane 12, it sequentially passes through the aperture 5b and the image re-forming lens 6b before forming an image on the light-receiving element 7b.

The reverse-projected image 1a of the opening aperture formed on the exit pupil 1c is a reverse-projected image of the aperture 5a achieved through the correction optical system 16 and the sub-mirror 3. Likewise, the reverse-projected image 1b of the opening aperture is a reverse-projected image of the aperture 5b achieved through the correction optical system 16 and the sub-mirror 3.

The images at the light-receiving elements 7a and 7b which are reverse-projected by the image re-forming lenses 6a and 6b overlap each other near the film equivalent plane 12 over the range around the predetermined position regarding height of image formed on the photographic field and this overlapping area constitutes a focal point detection area 13.

A central position 14 of the focal point detection area 13 matches the center of the photographic field (the optical axis 1d of the photographic optical system 1) in FIG. 2. In this situation, a focal point detection along the direction of the Y axis is performed on the optical axis id. When performing a focal point detection at the periphery of the photographic field the central position 14 of the focal point detection area 13 is set at the periphery of the photographic field. In this case, the pair of apertures 5a and 5b, the pair of image re-forming lenses 6a and 6b and the pair of light-receiving elements 7a and 7b, too, are set asymmetrically to each other relative to the optical axis 1d of the photographic optical system 1. In other words, their axes of symmetry are set at the predetermined position regarding height of image.

The light condensing function which is provided only at the sub-mirror 3 in the prior art is also achieved at the correction optical system 16 by constituting the entire correction optical system 16 as a convex lens. By adjusting the shape of the convex lens at the correction optical system 16, the directions along which the reverse-projected images 1a and 1b of the apertures are projected can be deflected in correspondence to the image height. In other words, the direction along which the focal point detection light fluxes 21a and 21b advance is adjusted in correspondence to the image height position at which the focal point detection is implemented. The convex lens at the correction optical system 16 normally has an aspheric surface which is asymmetrical along the direction in which the short side of the photographic field extends (along the Y axis) and is symmetrical along the direction in which the long side extends (along the X axis) relative to the center of the convex lens (relative to the point at which the convex lens intersects the optical axis 1d).

The correction optical system 16 adjusts the directions in which the reverse-projected images 1a and 1b of the apertures are projected in correspondence to the image height so that the each center points of the reverse-projected images 1a and 1b of the apertures on the exit pupil 1c of the photographic optical system 1 can be aligned with the optical axis 1d.

This point is now explained in detail.

FIG. 3 illustrates the relationship between the exit pupil 1c of the photographic optical system 1 and the range within which the focal point detection light fluxes pass. When the shapes of the apertures 5a and 5b are reverse-projected via the sub-mirror 3 toward the photographic optical system, 1a and 1b which represent the reverse-projected images of the apertures define the range within which the pair of focal point detection light fluxes pass on the exit pupil 1c of the photographic optical system 1.

Figure 3A:
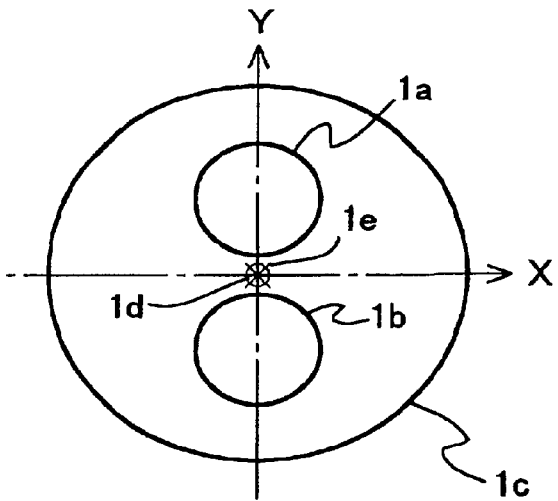
FIG. 3 schematically illustrates the relationship between the exit pupil and the reverse-projected image of the apertures.

FIG. 3A shows the range within which the focal point detection light fluxes pass on the exit pupil 1c of the photographic optical system 1 when the focal point detection position is set at the center of the photographic field (image height Y=0). The reverse-projected images 1a and 1b of the apertures are projected at positions symmetrical to each other relative to the optical axis 1d of the photographic optical system 1. In other words, a halfway point 1e between the pair of reverse-projected images 1a and 1b is aligned with the optical axis 1d. Thus, the focal point detection light fluxes which pass through areas symmetrical to each other relative to the optical axis 1d of the photographic optical system 1 are allowed to be transmitted without being eclipsed by the exit pupil 1c of the photographic optical system 1.

Figure 3B:
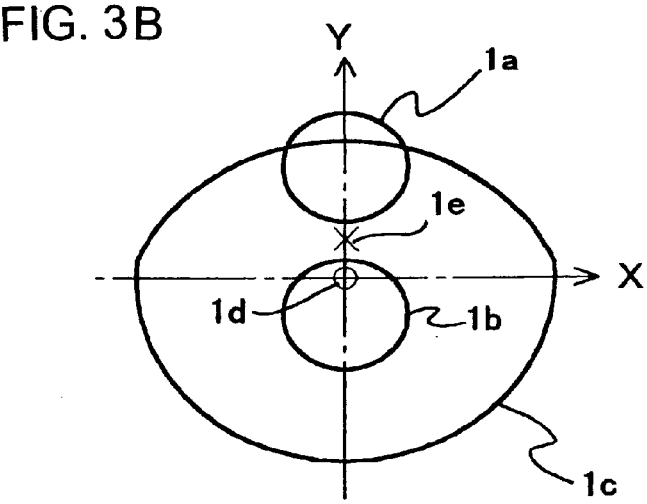

FIG. 3B shows the range over which the focal point detection light fluxes pass on the exit pupil 1c of the photographic optical system 1 when the focal point detection position is offset from the center of the photographic field 15 along the short side (along the Y axis) (height of image Y=Y1).

When the image height is great, the exit pupil 1c of the photographic optical system 1 usually forms a shape similar to a rugby ball rather than being completely circular due to the so-called "vignetteing" effect. This phenomenon is attributed to the photographic light flux being restricted by member other than the aperture. As a result, the focal point detection light fluxes tend to be eclipsed more readily in this situation than in a focal point detection performed at the center of the photographic field.

In addition, when a focal point detection is performed at a great image height by using the concave sub-mirror 3, the halfway position 1e between reverse-projected images 1a and 1b of the apertures is offset from the optical axis 1d of the photographic optical system 1. Consequently, one reverse-projected image 1a of the aperture of a pair is eclipsed even more readily. This vignetting of the focal point detection light fluxes occurs more frequently in a dark photographic optical system having a large F-number in which the exit pupil 1c is bound to be small.

One of the causes of the offset in the reverse-projected images 1a and 1b of the apertures, which occurs in correspondence to the image height is the position of the concave sub-mirror 3 which is set over a distance from the film equivalent plane along a diagonal direction relative to the optical axis 1d of the photographic optical system 1 to result in the concave sub-mirror 3 manifesting different optical characteristics for the light flux for focal point detection passing near the optical axis 1d of the photographic optical system 1 and for the light flux for focal point detection passing away from the optical axis 1d.

The offset is also attributable to the aspheric mirror such as a spheroidal mirror used to constitute the concave sub-mirror 3. A cross section of the sub-mirror 3 containing the Y axis normally achieves an asymmetrical shape relative to the point at which the optical axis 1d and the sub-mirror 3 intersect each other, in order to correct distortion of the subject images re-formed on the light-receiving elements 7a and 7b. If the reflection area on the sub-mirror 3 constituted of such an aspheric mirror is inconsistent, the directions along which the reverse-projected images are projected become offset in correspondence to the shape of the curve of the reflection area.

Since the area over which the sub-mirror 3 reflects the focal point detection light fluxes varies depending upon the position of the image height of the subject image undergoing the focal point detection, the directions along which the images 1a and 1b of the apertures are projected backward become offset in conformance to the image height position. The phenomenon whereby the reverse-projected images 1a and 1b of the apertures become offset in correspondence to the image height position is more pronounced with regard to the image height along the direction of the short side of the photographic field (along the Y axis), as the concave sub-mirror is tilted relative to the Y axis.

In the phase difference detection method, the defocus quantity manifested at the photographic optical system is detected by comparing the relative offset of the light quantity distributions achieved by a pair of light fluxes passing through a pair of areas at the exit pupil of the photographic optical system. Thus, if one of the focal point detection light fluxes is eclipsed as described above, an accurate defocus quantity cannot be detected.

Figure 3C:
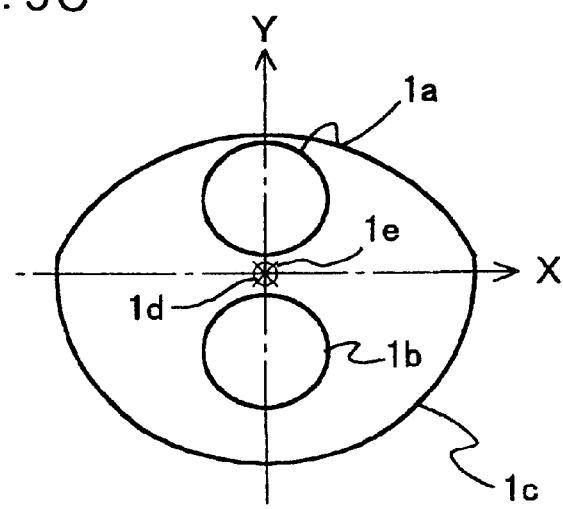

When the focal point detection area is offset from the center of the photographic field along the direction of the short side of the photographic field (image height Y=Y1) as shown in FIG. 3C, the exit pupil 1c of the photographic optical system 1 forms a shape similar to a rugby ball rather than a completely circular shape due to the so-called "vignetting" at the lens as explained earlier. In the first embodiment, the directions along which the images of the apertures 5a and 5b are projected backward are adjusted by the correction optical system 16, and thus, the reverse-projected images 1a and 1b of the apertures on the exit pupil 1c of the photographic optical system 1 are not eclipsed, as shown in FIG. 3C.

By providing the correction optical system 16 within the optical path of the focal point detection light fluxes as described above, an additional refracting plane is provided in addition to that in the prior art to increase the degree of freedom in the optical design of the focal point detection optical system 22 and the sub-mirror 3. As a result, the adjustment of the directions in which the images of the apertures are projected, which is difficult to achieve with a single surface of the concave mirror constituting the sub-mirror 3 is facilitated and, at the same time, it becomes possible to achieve an improvement in the correction of distortions of the images formed on the light-receiving elements 7a and 7b.

The focal adjustment state of the photographic optical system 1 can be detected by detecting the relative positions of the pair of images formed on the light-receiving elements 7a and 7b as described above. The secondary images of the pair of subject images formed on the light-receiving elements 7a and 7b are set apart from each other in a so-called front focus state in which a highly defined image of the subject is formed forward of the film equivalent plane 12 by the photographic optical system 1, whereas they are set closer to each other in a so-called rear focus state, in which the highly defined image is formed rearward of the film equivalent plane 12. In a so-called focused state in which the highly defined image of the subject is formed by the photographic optical system 1 at the film equivalent plane 12, the subject images on the light-receiving elements 7a and 7b become aligned with each other relatively.

The secondary images of the pair of subject images formed by the focal point detection optical system 22 undergo photoelectric conversion at the light-receiving elements 7a and 7b to become electrical signals. The resulting pair of the subject image signals then undergo arithmetic processing at a control circuit (not shown) to ascertain the relative positions of the secondary images of the pair of subject images. Based upon the relative positions thus ascertained, the focal adjustment state at the photographic optical system 1, i.e., the extent of the deviation from the focused state and the direction of the deviation, which may be referred to as a defocus quantity, is detected. As explained earlier, by changing the positions of the photoelectric conversion elements 7a and 7b within the photographic field, i.e., by changing the positions at which the subject image signals are taken in, the focal point detection position can be adjusted.

The present invention is not limited to the embodiment explained above and it allows for numerous variations and modifications. The correction optical system 16 does not need to be formed as an integrated part of the main mirror 2, and instead, the correction optical system 16 may be formed as a separate unit from the main mirror 2 and mounted at the rear of the main mirror 2. This structure further increases the number of surfaces of the correction optical system 16 to enable even finer adjustments of the directions in which the images of the apertures are projected.

If it proves too costly to achieve the required flatness at the main mirror 2 through plastic molding, the main mirror 2 and the correction optical system 16 may be formed with different materials, e.g., the main mirror 2 may be formed with glass and the correction optical system 16 may be formed with plastic, to enhance the degree of freedom in production.

In order to further improve the optical characteristics of the focal point detection optical system, the correction optical system 16 may be constituted with a plurality of optical members.

The position of the correction optical system 16 is not limited to the rear surface of the main mirror 2 and, as long as it is provided between the main mirror 2 and the sub-mirror 3, it can be housed to achieve a compact configuration during a photographing operation without interfering with the observation optical system. For instance, the convex lens may be provided perpendicular to the optical axis at a position halfway between the main mirror 2 and the sub-mirror 3. Since the correction optical system 16 is not set at a diagonal position relative to the optical axis in this arrangement, the optical aberration is reduced and the design of the correction optical system 16 is facilitated.

The shape of the surface of the convex lens constituting the correction optical system 16 may be varied along the X axis and the Y axis as described earlier, and the correction optical system 16 may be constituted of, for instance, a cylindrical lens which achieves a curvature along the Y axis only. In such a case, the preparation of the die is facilitated when forming the lens through plastic molding.

Variation of First Embodiment

Figure 4:
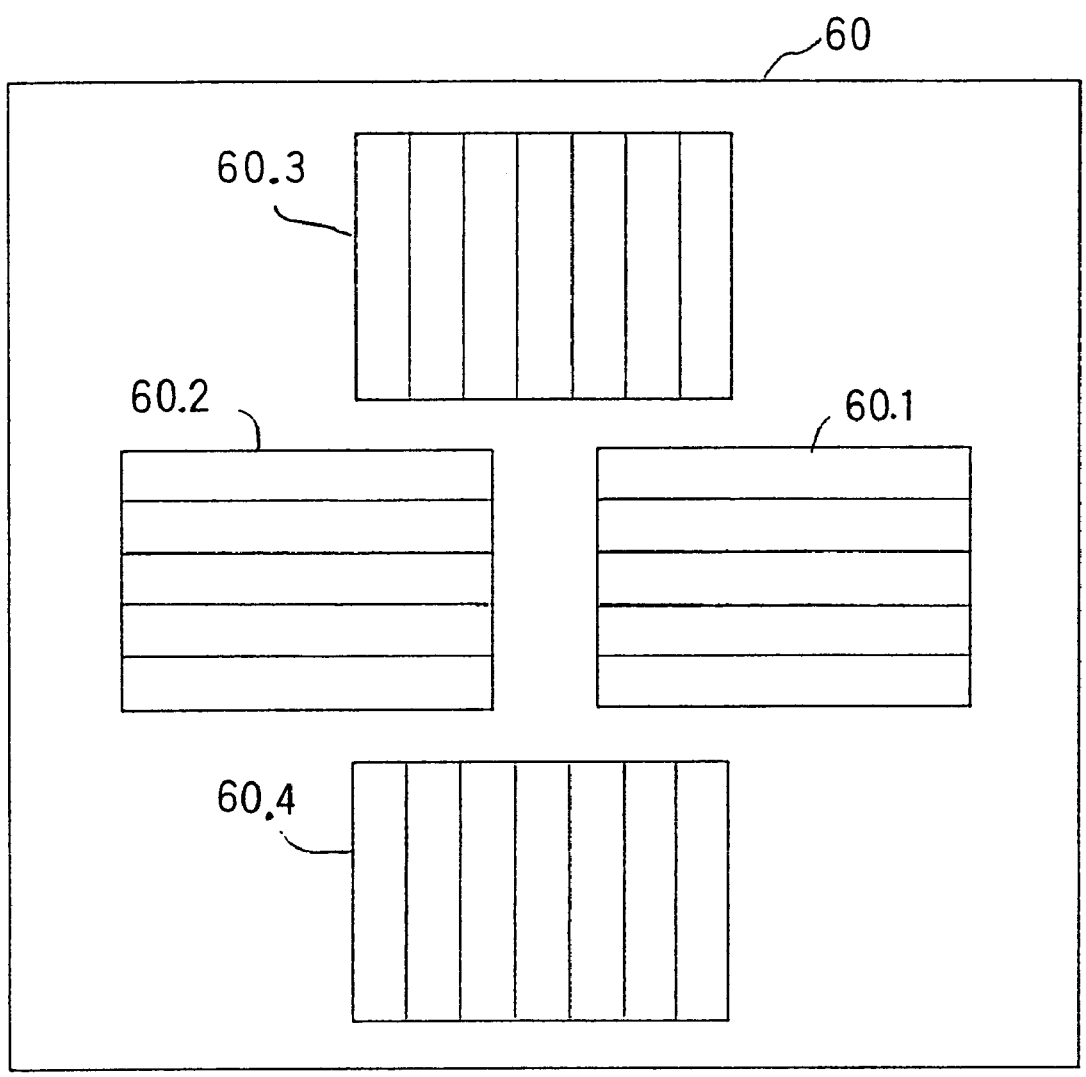
FIG. 4 illustrates the structure of the image sensor chip adopted in a variation of the first embodiment.

The light-receiving elements 7a and 7b in the first embodiment may be achieved in the form of the image sensor chip shown in FIG. 4. This image sensor chip 60 includes a pair of two-dimensional image sensor arrays 60.1 and 60.2 set along the horizontal direction (along the X axis) and a pair of two-dimensional image sensor arrays 60.3 and 60.4 set along the vertical direction (along the Y axis). The image sensor arrays 60.1~60.4 are each constituted by two-dimensionally arraying pixels each constituted of a photoelectric conversion element which outputs an electrical signal corresponding to the intensity of light.

In the image sensor chip 60 in this variation, the pair of image sensor arrays 60.1 and 60.2 provided along the horizontal direction over a small interval from each other are set between the pair of image sensor arrays 60.3 and 60.4 provided along the vertical direction so that a cross shape is formed by the pair of image sensor arrays 60.1 and 60.2 provided along the horizontal direction and the pair of image sensor arrays 60.3 and 60.4 provided along the vertical direction. By providing the horizontal image sensor arrays 60.1 and 60.2 and the vertical image sensor arrays 60.3 and 60.4 in this manner, the width of the image sensor chip 60 along the horizontal direction can be reduced, and, as a result, the horizontal dimension of the focal point detection apparatus that engages in a focal point detection over a wide range around the optical axis of the photographic light flux can be reduced.

Figure 5:
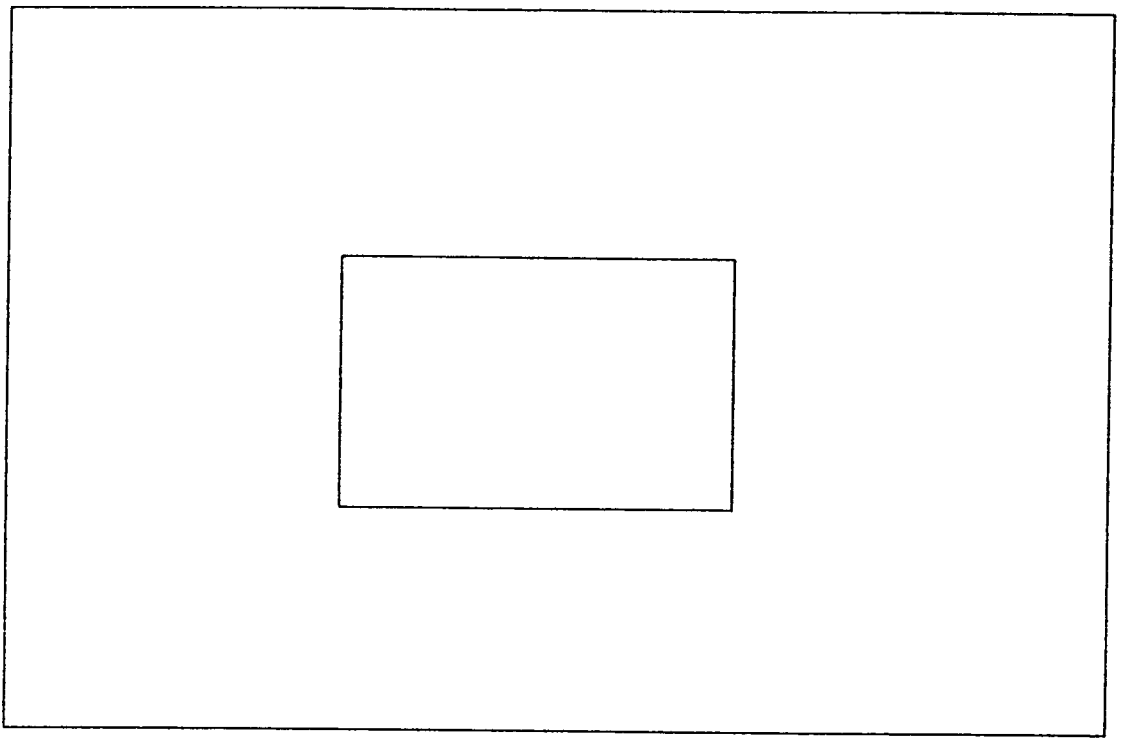
FIG. 5 shows the focal point detection area of a focal point detection apparatus that enables a focal point detection over a wide range in the photographic field.

In other words, the horizontal dimension of the focal point detection apparatus can be reduced compared to the vertical dimension. Thus, in addition to the reduction in the vertical dimension achieved by employing the concave mirror 3 and the correction optical system 16 (see FIG. 1), a focal point detection is enabled along the horizontal direction and of the vertical direction over a wide range within the photographic field, as shown in FIG. 5, without increasing the size of the image sensor chip 60 and, ultimately, without allowing the focal point detection apparatus to become large, by adopting this variation.

Figure 6:
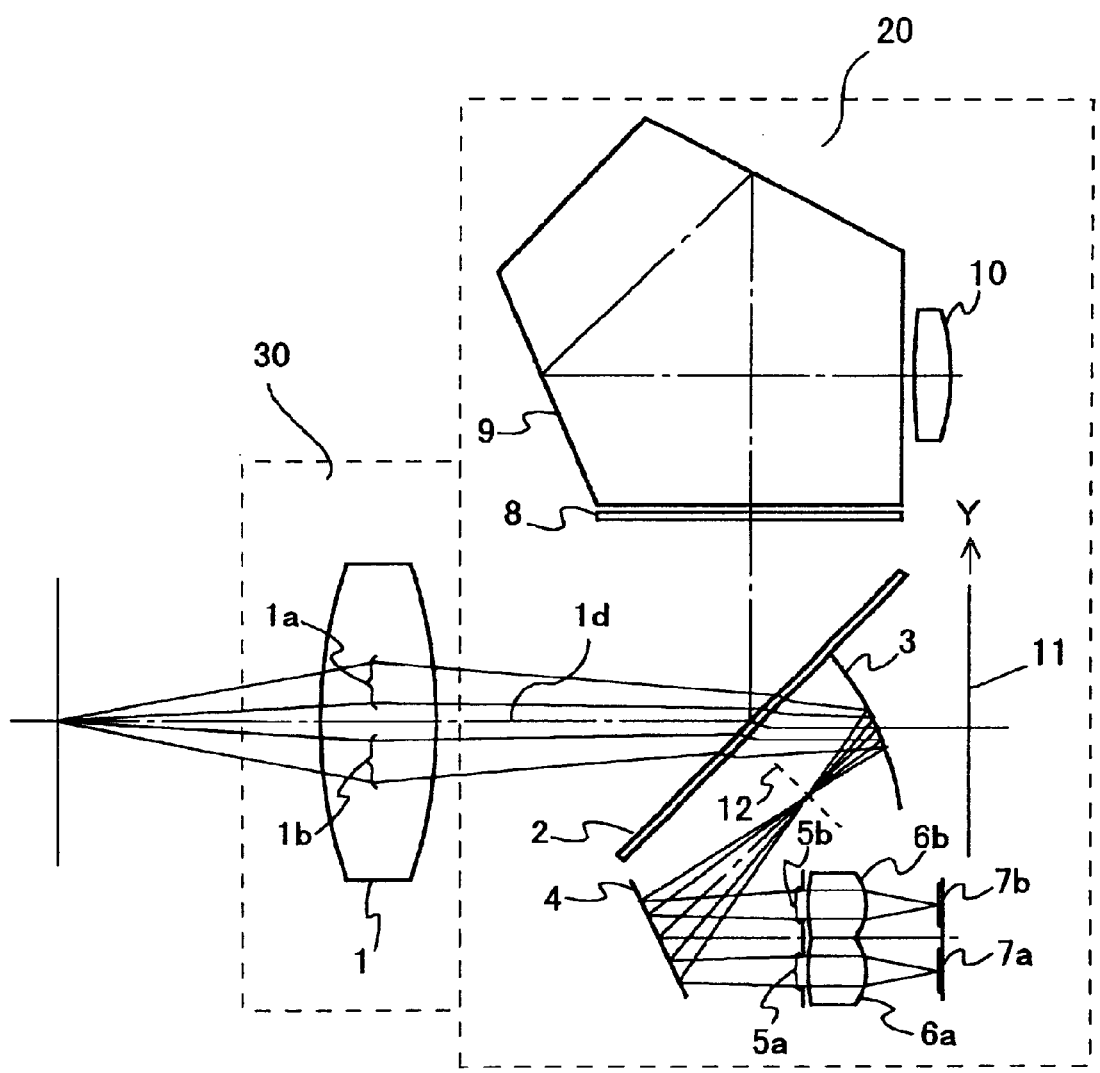
FIG. 6 is a block diagram of the focal point detection apparatus that does not include a correction optical system, achieved in the variation of the first embodiment.

The image sensor chip 60 shown in FIG. 4 may be utilized in the camera shown in FIG. 6. Namely, it may be utilized in a camera in that includes the concave mirror 3 but does not have a convex lens 2a at the rear surface of the half mirror 2.

In addition, a sub-mirror constituted of a plane mirror 3A instead of a concave mirror may be utilized in conjunction with the image sensor chip 60 shown in the FIG. 4. The following is an explanation of the structure adopted in the focal point detection apparatus achieved in a second embodiment.

Second Embodiment

Figure 7:
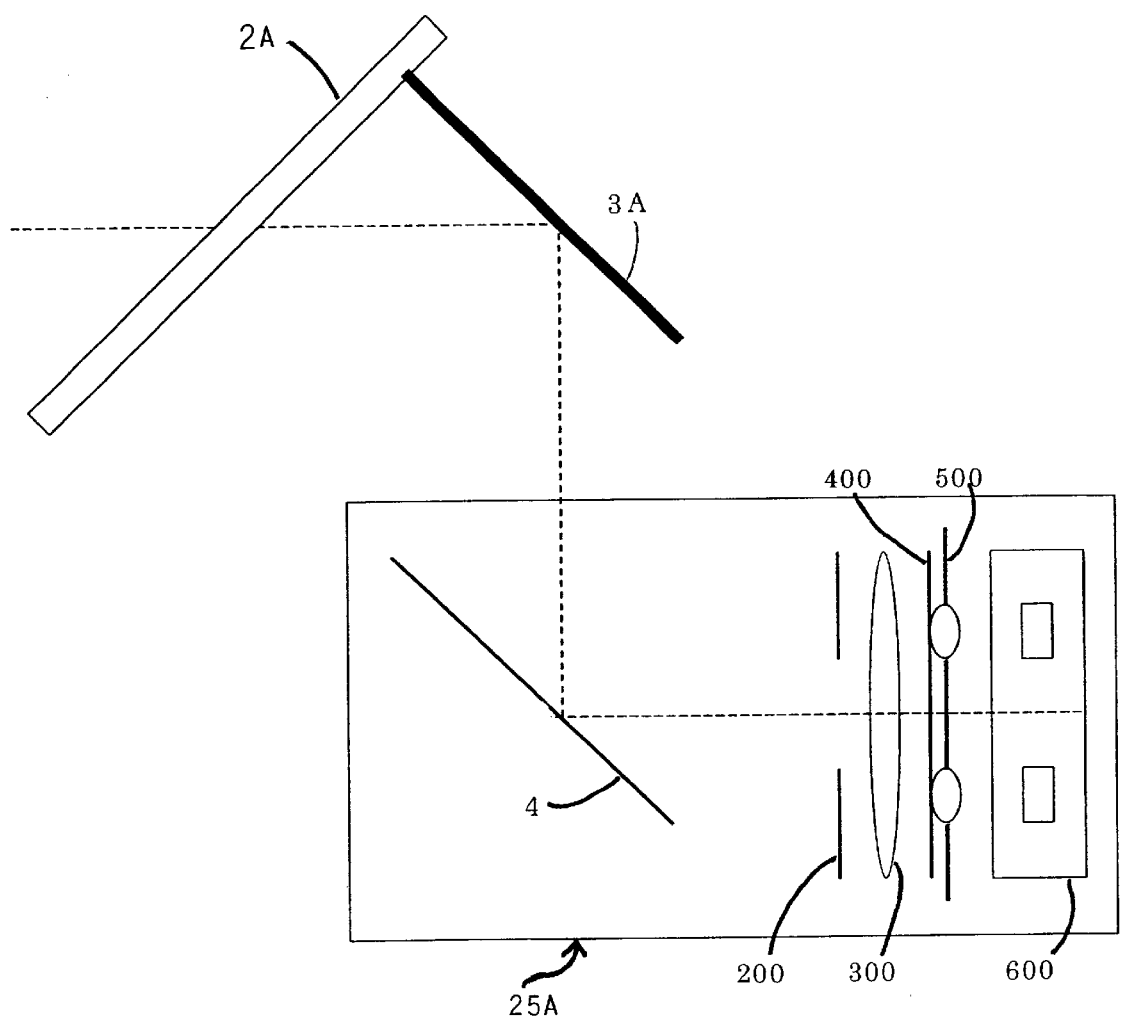
FIG. 7 is a block diagram of the focal point detection apparatus in a second embodiment, in which the concave sub-mirror is replaced by a plane mirror.
Figure 8:
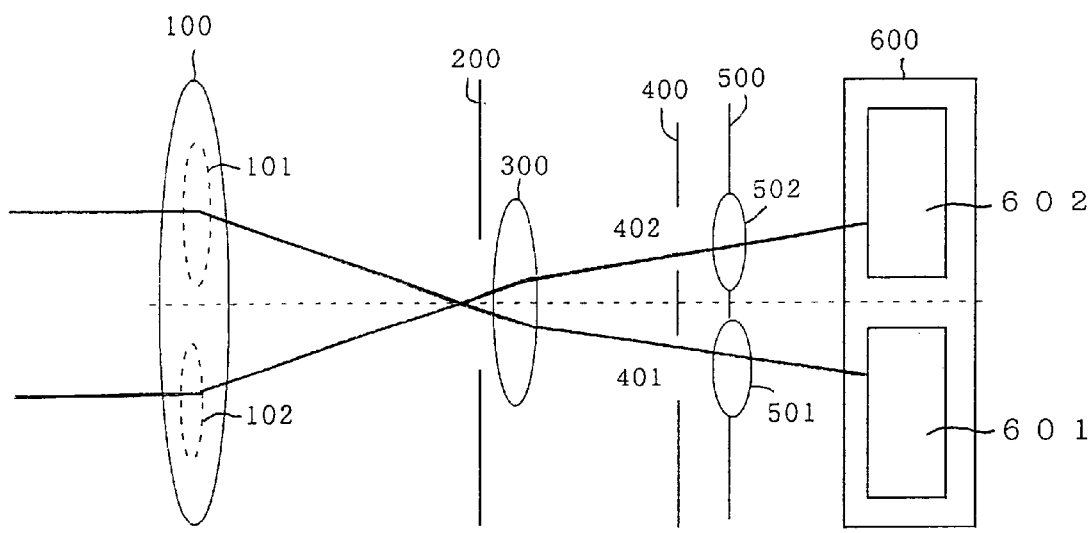
FIG. 8 is a block diagram of the focal point detection apparatus in the second embodiment.

As shown in FIG. 7, a light flux for focal point detection having been transmitted through a plane half mirror 2A is reflected downward at a plane sub-mirror 3A and enters a focal point detection apparatus 25A. FIG. 8 illustrates the principle adopted in the focal point detection apparatus 25A that performs a focal point detection in the phase difference detection method in the second embodiment. The focal point detection apparatus 25A includes a focal point detection optical system constituted of a field mask 200, a field lens 300 (the field mask 200 and the field lens 300 together achieve a function similar to that of the concave mirror 3 in the first embodiment), an aperture mask 400 having two openings 401 and 402 and an image re-forming lens 500 constituted of two lenses 501 and 502, and an image sensor chip 600 mounted with a pair of image sensor arrays 601 and 602. The focal point detection optical system and the image sensor chip 600 are fitted in a resin holder and are housed at the bottom of the camera main body.

In this focal point detection optical system, the openings 401 and 402 at the aperture mask 400 are projected by the field lens 300 onto areas 101 and 102 of the photographic lens 100. These areas 101 and 102 are also referred to as reverse-projected images. As a result, a light flux having entered via the area 101 of the photographic lens 100 passes through the field mask 200, the field lens 300, the aperture 401 and the image re-forming lens 501 to form an image on the image sensor array 601 at the image sensor chip 600. Likewise a light flux having entered via the area 102 of the photographic lens 100 passes through the field mask 200, the field lens 300, the aperture 402 and the image re-forming lens 502 to form an image on the image sensor array 602 at the image sensor chip 600.

The pair of subject images formed on the image sensor arrays 601 and 602 are set close to each other in a so-called front focus state in which of the photographic lens 100 forms a highly defined image of the subject further forward relative to an anticipated focal plane. In contrast, they are set further away from each other in a so-called rear focus state in which the highly defined image of the subject is formed further rearward relative to the anticipated focal plane. They are relatively aligned with each other in the so-called focused state in which the highly defined image of the subject is formed on the anticipated focal plane. Thus, by converting the pair of subject images to electrical signals through photoelectric conversion performed at the image sensor arrays 601 and 602 and ascertaining the degree of relative positional offset manifested by the pair of subject images through arithmetic processing implemented on the signals, the focal adjustment state of the photographic lens 100 can be detected. The reverse-projected images of the image sensor arrays 601 and 602 formed by the image re-forming lenses 501 and 502 overlap each other near the anticipated focal plane, and this overlapping area is used as a focal point detection area. In the focal point detection apparatus in the embodiment, a single focal point detection area is set at the center of the photographic field.

FIG. 9 presents a specific structural example that may be adopted in the focal point detection apparatus in the second embodiment utilizing the image sensor chip 60 shown in FIG. 4. It is to be noted that FIG. 9B illustrates in detail an image re-forming lens 105 in FIG. 9A.

This focal point detection apparatus includes a focal point detection optical system constituted of a visual field mask 102 having a rectangular opening set on the optical axis of a photographic lens 101, a field lens 103, an aperture mask 104 having four openings 4.1, 4.2, 4.3 and 4.4 and an image re-forming lens 105 constituted of four lenses 5.1, 5.2, 5.3 and 5.4, and the image sensor chip 60 shown in FIG. 4.

The opening at the field mask 102 in this focal point detection apparatus is formed in a rectangular shape. In addition, the distance between the pair of openings 4.1 and 4.2 formed along the horizontal direction at the aperture mask 104 is small so that the pair of openings 4.1 and 4.2 provided along the horizontal direction are set between the pair of openings 4.3 and 4.4 provided along the vertical direction. Likewise, the distance between the pair of lenses 5.1 and 5.2 provided along the horizontal direction at the image re-forming lens 105 is small so that the pair of lenses 5.1 and 5.2 provided along the horizontal direction are set between the pair of lenses 5.3 and 5.4 provided along the vertical direction. As a result, the distance between a pair of reverse-projected images 1.1 and 1.2 among reverse-projected images 1.1~1.4 of the aperture mask openings 4.1~4.4 projected onto the photographic lens 101 by the field lens 103 is small and the pair of reverse-projected images 1.1 and 1.2 formed along the horizontal direction are set between the pair of reverse-projected images 1.3 and 1.4 formed along the vertical direction.

The width of the focal point detection apparatus 25A along the horizontal direction is smaller than its vertical dimension in the second embodiment.

Figure 10:
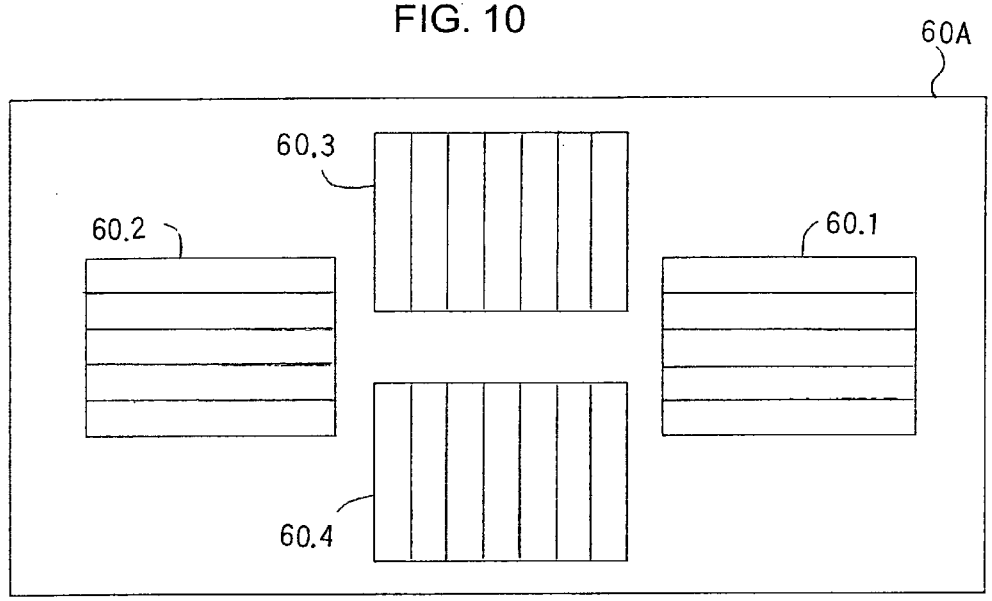
FIG. 10 illustrates the effectiveness of the structure adopted in the image sensor chip in the second embodiment.

It is conceivable to allow a smaller distance between the pair of image sensor arrays 60.3 and 60.4 provided along the vertical direction and set the pair of image sensor arrays 60.3 and 60.4 provided along the vertical direction between the pair of image sensor arrays 60.1 and 60.2 provided along the horizontal direction as illustrated in FIG. 10, in the reverse configuration with respect to the image sensor arrays 60.1~60.4 shown in FIG. 4. However, the image sensor chip adopting such a configuration cannot be mounted in the camera shown in FIG. 11 for the following reason.

Figure 11:
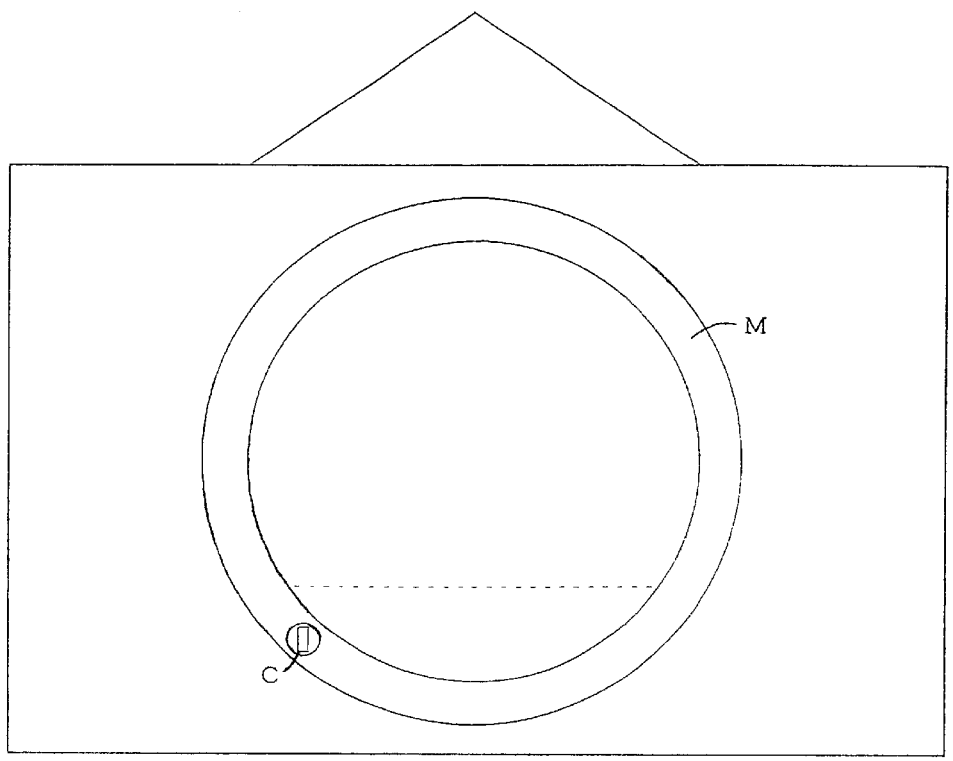
FIG. 11 is a front view of an autofocus single lens reflex camera.

FIG. 11 is a front view of an autofocus single lens reflex camera provided with a focal point detection apparatus.

A standard autofocus single lens reflex camera mounted with a lens drive motor inside the camera main body includes a mount M at which an interchangeable lens is mounted at the center of the front side of the camera main body and a lens drive coupling C set diagonally below the mount M. When the interchangeable lens is mounted at the camera main body via the mount M, the lens drive motor inside the camera main body becomes linked with a focusing mechanism inside the interchangeable lens via the coupling C and the lens drive motor inside the camera main body engages in a focal adjustment of the focusing lens in the interchangeable lens.

Since the lens drive motor that drives and rotates the coupling C, a gear train and the like are provided near the coupling C at the bottom (the space under the dotted line in FIG. 11) of the camera main body, only limited space is available at the bottom of the camera main body in this type of camera. Consequently, if an image sensor chip 60A having a large dimension along the horizontal direction of the photographic field, i.e., along the lateral direction of the camera main body, as shown in FIG. 10, is employed, the lateral width of the holder of the focal point detection apparatus increases and interferes with the gears and the like. As a result, the focal point detection apparatus cannot be housed at the bottom of the camera main body.

An autofocus single lens reflex camera has a larger margin of space at the camera main body along the vertical direction, compared to the space available at the bottom of the main body where the available space is mostly taken up by the lens drive motor, the gear train and the like. This spatial margin along the vertical direction can be varied among different models of cameras and allows for a high degree of design flexibility. While the width of the image sensor chip 60 along the horizontal direction of the photographic field, i.e., the width along the lateral direction of the camera main body, is reduced when the image sensor chip 60 having the image sensor arrays 60.1~60.4 provided as shown in FIG. 4 is utilized, the width along the vertical direction of the photographic field, i.e., the width along the vertical direction of the camera main body increases. However, since the spatial margin along the vertical direction of the camera main body is great and a high degree of flexibility is afforded in modifying the design, this does not present a problem.

It is to be noted that while a pair of image sensor arrays are provided both along the horizontal direction and the vertical direction of the photographic field in the second embodiment, it is not necessary to set a pair of image sensor arrays exactly along the horizontal direction and exactly along the vertical direction of the photographic field and they may be set along a substantially horizontal direction and a substantially vertical direction relative to the photographic field.

In addition, while the focal point detection area in the second embodiment achieves a precisely rectangular shape, the focal point detection area does not need to be precisely rectangular and it may be formed in a substantially rectangular shape.

What is claimed is:

1. A camera comprising:
    a semi-transmissive reflecting member that reflects part of a light flux from a photographic optical system to an observation optical system and transmits another part of the light flux to be a light flux for focal point detection;
    a reflecting member comprising a concave mirror that reflects the light flux for focal point detection having been transmitted through said semi-transmissive reflecting member;
    a focal point detection apparatus, with a focal point detection optical system having apertures, that detects a focal adjustment state of a subject image formed by said photographic optical system by using the light flux for focal point detection having been reflected by said reflecting member; and
    a correction optical system, within an optical path between said semi-transmissive reflecting member and said reflecting member, that deflects the directions along which reverse-projected images of said apertures are projected backward toward said photographic optical system by said reflecting member to adjust a position of the reverse-projected images of said apertures, which have been formed on an exit pupil of said photographic optical system and have been offset from an optical axis of said photographic optical system, in relation to a direction in which said reverse-projected images have been offset.

2. A camera according to claim 1, wherein:
    said focal point detection apparatus detects the focal adjustment state of the subject image at a predetermined image height position in a photographic field of said photographic optical system; and
    said correction optical system changes the direction along which the light flux for focal point detection advances by deflecting the directions along which said apertures are projected backward toward said photographic optical system by said reflecting member in correspondence to the image height position.

3. A camera according to claim 2, wherein;
    said correction optical system and said semi-transmissive reflecting member are formed as an integrated unit.

4. A camera according to claim 2, wherein;
    said correction optical system and said semi-transmissive reflecting member are formed as an integrated unit constituted of a plano-convex lens.

5. A camera according to claim 1, wherein:
    said correction optical system corrects any deviation of the reverse-projected images in relation to the optical axis of said photographic optical system.

6. A focal point detection apparatus comprising:
    an image sensor chip having a pair of two-dimensional image sensors corresponding to a focal point detection area along a substantially horizontal direction of a photographic field and a pair of two-dimensional image sensors corresponding to the focal point detection area along a substantially vertical direction of the photographic field; and
    a focal point detection optical system comprising an aperture mask having a pair of openings formed along the substantially horizontal direction and a pair of openings formed along the substantially vertical direction, and an image reforming lens comprising a pair of lenses provided along the substantially horizontal direction and a pair of lenses provided along the substantially vertical direction, the focal point detection optical system forming separate images of a light flux from a subject having passed through a photographic optical system onto said pair of two-dimensional image sensors provided along the substantially horizontal direction and onto said pair of two-dimensional image sensors provided along the substantially vertical direction, wherein
    said pair of two-dimensional image sensors provided along the substantially horizontal direction and said pair of two-dimensional image sensors provided along the substantially vertical direction each comprise two-dimensionally arraying pixels of a photoelectric conversion element, in said image sensor chip, said pair of two-dimensional image sensors provided along the substantially horizontal direction over a small interval from each other along the horizontal direction are set between said pair of two-dimensional image sensors provided along the substantially vertical direction with said pair of two-dimensional image sensors provided along the substantially horizontal direction and said pair of two-dimensional image sensors provided along the substantially vertical direction forming a cross shape, a distance between said pair of openings formed along the substantially horizontal direction in said aperture mask is set smaller than a distance between said pair of openings formed along the substantially vertical direction, and a distance between said pair of lenses provided along the substantially horizontal direction at said image reforming lens is set smaller than a distance between said pair of lenses provided along the substantially vertical direction.

7. A camera comprising:

a semi-transmissive reflecting member that reflects part of a light flux from a photographic optical system to an observation optical system and transmits another part of the light flux to be a light flux for focal point detection;

a reflecting member comprising a concave mirror that reflects the light flux for focal point detection having been transmitted through said semi-transmissive reflecting member;

a focal point detection apparatus, with a focal point detection optical system having apertures, that detects a focal adjustment state of a subject image formed by said photographic optical system by using the light flux for focal point detection having been reflected by said reflecting member; and a correction optical system, within an optical path between said semi-transmissive reflecting member and said reflecting member, that deflects the directions along which reverse-projected images of said apertures are projected backward toward said photographic optical system by said reflecting member to adjust a position of the reverse-projected images of said apertures, which have been formed on an exit pupil of said photographic optical system and have been offset from an optical axis of said photographing optical system, in relation to a direction in which said reverse-projected images have been off set, wherein said focal point detection apparatus comprises an image sensor chip having a pair of two-dimensional image sensors corresponding to a focal point detection area along a substantially horizontal direction of a photographic field and a pair of two-dimensional image sensors corresponding to the focal point detection area along a substantially vertical direction of the photographic field, said focal point detection optical system forms separate images of the light flux from a subject having passed through said photographic optical system onto said pair of two-dimensional image sensors provided along the substantially horizontal direction and onto said pair of two-dimensional image sensors provided along the substantially vertical direction, and said pair of two-dimensional image sensors provided along the substantially horizontal direction over a small interval from each other along the horizontal direction are set between said pair of two-dimensional image sensors provided along the substantially vertical direction so that said pair of two-dimensional image sensors provided along the substantially horizontal direction and said pair of two-dimensional image sensors provided along the substantially the vertical direction form a cross shape at said image sensor chip.

8. A camera according to claim 7, wherein;

said focal point detection optical system includes apertures for defining the focal point detection area;

said focal point detection apparatus detects the focal adjustment state of the subject image at a predetermined image height position at the photographic field of said photographic optical system; and said correction optical system changes the direction along which the light flux for focal point detection advances by deflecting the directions along which said apertures are projected backward toward said photographic optical system by said reflecting member in correspondence to the image height position.

9. A camera according to claim 7, wherein;

said correction optical system and said semi-transmissive reflecting member are formed as an integrated unit.

10. A camera according to claim 7, wherein;

said correction optical system and said semi-transmissive reflecting member are formed as an integrated unit constituted of a plano-convex lens.

11. A camera comprising:

a semi-transmissive reflecting member that reflects part of a light flux from a photographic optical system to an observation optical system and transmits another part of the light flux to be a light flux for focal point detection;

a reflecting member comprising a concave mirror that reflects the light flux for focal point detection having been transmitted through said semi-transmissive reflecting member; and a focal point detection apparatus that detects a focal adjustment state of a subject image formed by said photographic optical system by using the light flux for focal point detection having been reflected by said reflecting member, wherein said focal point detection apparatus comprises an image sensor chip having a pair of two-dimensional image sensors corresponding to a focal point detection area along a substantially horizontal direction of a photographic field and a pair of two-dimensional image sensors corresponding to the focal point detection area along a substantially vertical direction of the photographic field, and a focal point detection optical system comprising an aperture mask having a pair of openings formed along the substantially horizontal direction and a pair of openings formed along the substantially vertical direction, and an image reforming lens comprising a pair of lenses provided along the substantially horizontal direction and a pair of lenses provided along the substantially vertical direction, the focal point detection optical system forming separate images of a light flux from a subject having passed through said photographic optical system onto said pair of two-dimensional image sensors provided along the substantially horizontal direction and onto said pair of two-dimensional image sensors provided along the substantially vertical direction, wherein
said pair of two-dimensional image sensors being provided along the substantially horizontal direction and said pair of two-dimensional image sensors being provided along the substantially vertical direction are each comprised of two-dimensionally arraying pixels of a photoelectric conversion element, said pair of two-dimensional image sensors being provided along the substantially horizontal direction over a small interval from each other along the horizontal direction are set between said pair of two-dimensional image sensors provided along the substantially vertical direction with said pair of two-dimensional image sensors provided along the substantially horizontal direction and said pair of two-dimensional image sensors provided along the substantially the vertical direction forming a cross shape at said image sensor chip, a distance between said pair of openings formed along the substantially horizontal direction in said aperture mask is set smaller than a distance between said pair of openings formed along the substantially vertical direction, and a distance between said pair of lenses provided along the substantially horizontal direction at said image reforming lens is set smaller than a distance between said pair of lenses provided along the substantially vertical direction.

12. A camera comprising:

a semi-transmissive reflecting member that reflects part of a light flux from a photographic optical system to an observation optical system and transmits another part of the light flux to be a light flux for focal point detection;

a reflecting member comprising a plane mirror that reflects the light flux for focal point detection having been transmitted through said semi-transmissive reflecting member; and a focal point detection apparatus that detects a focal adjustment state of a subject image formed by said photographic optical system by using the light flux for focal point detection having been reflected by said reflecting member, wherein said focal point detection apparatus comprises
an image sensor chip having a pair of two-dimensional image sensors corresponding to a focal point detection area along a substantially horizontal direction of a photographic field and a pair of two-dimensional image sensors corresponding to the focal point detection area along a substantially vertical direction of the photographic field, and a focal point detection optical system comprising an aperture mask having a pair of openings formed along the substantially horizontal direction and a pair of openings formed along the substantially vertical direction, and an image reforming lens comprising a pair of lenses provided along the substantially horizontal direction and a pair of lenses provided along the substantially vertical direction, the focal point detection optical system forming separate images of the light flux from a subject having passed through said photographic optical system onto said pair of two-dimensional image sensors provided along the substantially horizontal direction and onto said pair of two-dimensional image sensors provided along the substantially vertical direction, wherein
said pair of two-dimensional image sensors being provided along the substantially horizontal direction and said pair of two-dimensional image sensors being provided along the substantially vertical direction are each comprised of two-dimensionally arraying pixels of a photoelectric conversion element, said pair of two-dimensional image sensors being provided along the substantially horizontal direction over a small interval from each other along the horizontal direction are set between said pair of two-dimensional image sensors provided along the substantially vertical direction with said pair of two-dimensional image sensors provided along the substantially horizontal direction and said pair of two-dimensional image sensors provided along the substantially the vertical direction forming a cross shape at said image sensor chip, distance between said pair of openings formed along the substantially horizontal direction in said aperture mask is set smaller than a distance between said pair of openings formed along the substantially vertical direction, and a distance between said pair of lenses provided along the substantially horizontal direction at said image reforming lens is set smaller than a distance between said pair of lenses provided along the substantially vertical direction.

* * * * *

UNITED STATES PATENT AND TRADEMARK OFFICE
CERTIFICATE OF CORRECTION

PATENT NO.   : 6,643,460 B2
DATED        : November 4, 2003
INVENTOR(S)  : Shigeyuki Uchiyama et al.

It is certified that error appears in the above-identified patent and that said Letters Patent is hereby corrected as shown below:

Column 16,
Line 38, before "distance" insert -- a --.

Signed and Sealed this

Ninth Day of March, 2004

JON W. DUDAS
*Acting Director of the United States Patent and Trademark Office*